July 5, 1927.
E. CONSTAM
1,634,609
STEAM PLANT
Original Filed May 15, 1922   2 Sheets-Sheet 1
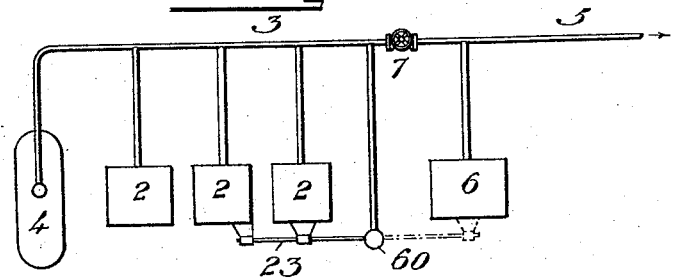

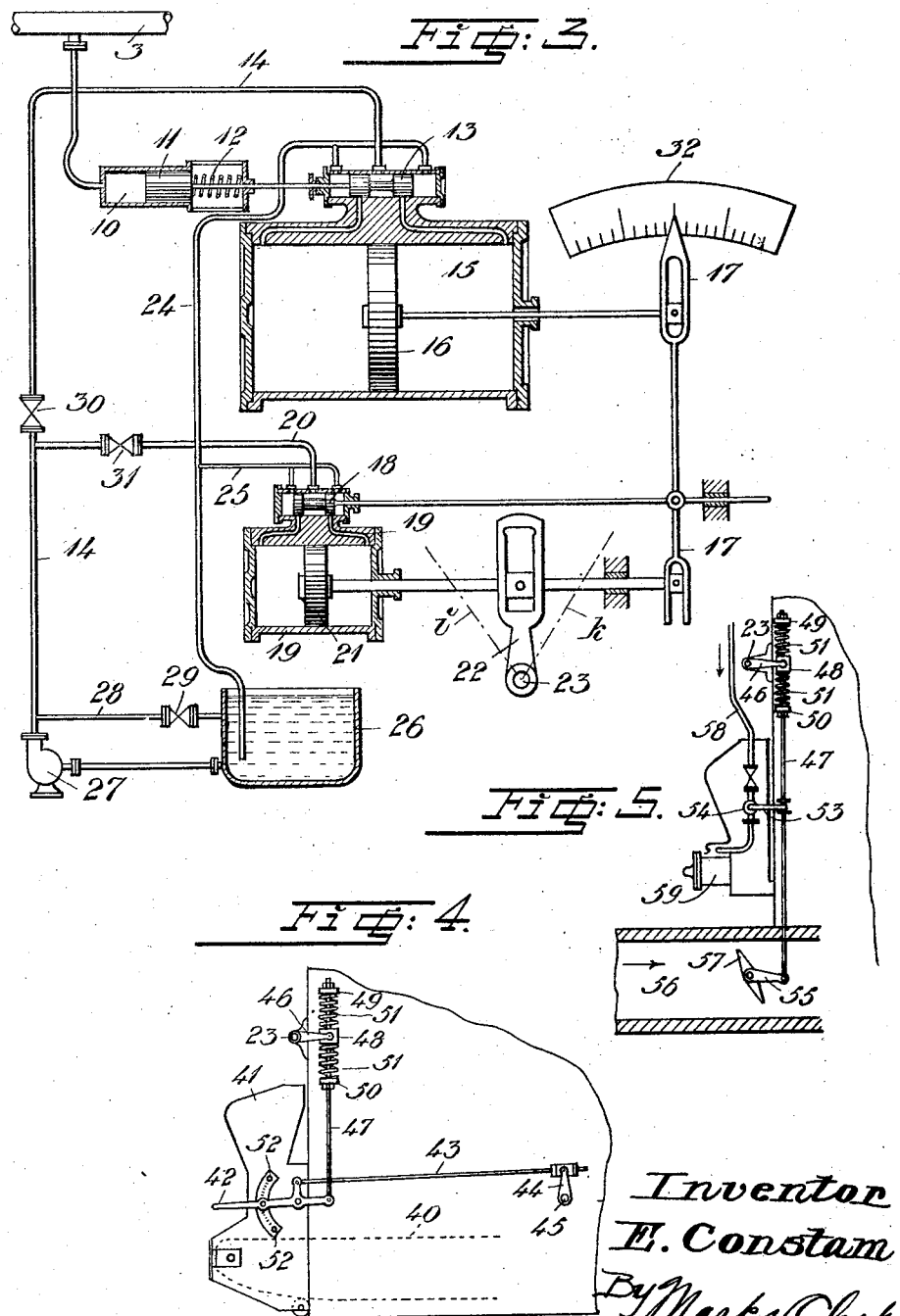

Patented July 5, 1927.

1,634,609

UNITED STATES PATENT OFFICE.

ERNST CONSTAM, OF ZURICH, SWITZERLAND, ASSIGNOR TO AKTIEBOLAGET VAPOR-ACKUMULATOR, OF STOCKHOLM, SWEDEN, A CORPORATION.

STEAM PLANT.

Application filed May 15, 1922, Serial No. 561,240, and in Germany March 29, 1922. Renewed April 30, 1927.

This invention relates to an automatic regulation for the fire of boilers in plants equipped with steam accumulators and has for its purpose to provide a means for regulating the intensity of the fires when the pressure in the accumulator or a conduit connected therewith rises above or falls below certain limits of pressures, whereas the regulating device remains inactive while the pressure is at intermediate values between the above-mentioned limits, so that the accumulator takes care of small rapid variations of steam consumption in the plant and the regulating means takes care of large gradual variations. By this means the intensity of the fires may be kept constant for a considerable length of time, then slowly changed to a greater or less intensity and kept at this second intensity for some time while the accumulator takes up the more rapid variations in the plant.

The invention is described below with reference to Figs. 1 to 6 on the accompanying drawing in which:—

Fig. 1 is a diagrammatic view of a steam plant provided with steam accumulator. Fig. 2 is a diagram. Figs. 3, 4 and 5 illustrate detail views and Fig. 6 a steam plant also provided with a steam accumulator.

The plant shown in Fig. 1 is provided with three boilers having large water space and designated by 2, the boilers being for instance constructed for a steam pressure of 12 atm. These boilers are connected in parallel with a steam conduit 3. Connected with the boilers is also a steam accumulator 4 adapted upon increasing pressure in the conduit 3 to receive steam and to deliver the same upon decreasing pressure. Branching out from the steam conduit 3 by means of a reducing valve 7 is a steam conduit 5 having a pressure of 5 atm. leading to the steam consumers not shown on the drawing. Connected with the latter conduit is another boiler 6 constructed for instance for 5 atm.

Fig. 3 illustrates an apparatus suitable nected with the same indicate a regulating apparatus described below in connection with Figs. 3, 4 and 5, the influence of this apparatus upon the intensity of fire being also explained.

In the diagram shown in Fig. 2 the abscissa designate time for all curves. Curve $a$ represents the consumed quantity of steam which varies considerably. Curve $d$ represents a line along which steam is generated so that the accumulator can take care of rapid variations and may be made of convenient size and the pressure will not vary too greatly. In other words, where the steam consumption curve has the form of curve $a$, it is desirable for the best operation of the plant to generate steam along line $d$. Curve P designates the pressure in conduit 3 when steam is consumed according to curve $a$ and the intensity of the fire is regulated according to curve $g$—$h$. By regulating the intensity of the fire according to line $g$—$h$ the steam is generated as near as possible to line $d$. The pressure in conduit 3 may vary, in the specific illustration shown, for instance, from 10 atmospheres down to 6 atmospheres which corresponds to about 150 and 90 lbs. per sq. in. respectively. The quantities of steam corresponding to the surfaces $c$, cross-hatched by horizontal lines, are accumulated. The quantities of steam corresponding to the surfaces $b$, cross-hatched by vertical lines, are given off by the accumulator.

The present problem consists consequently in the regulation of the intensity of fire according to the line $d$ and particularly, in avoiding overregulations at $e$ and $f$. The curve P of the steam pressure is a counterpart of the curve $a$. If namely the accumulating capacity is proportional to the pressure, which occurs approximately in certain accumulators and between certain limits of pressure, the desired regulation of the intensity of fire may be effected according to curve P instead of according to the curve $a$, which may be easily proved.

Fig. 3 illustrates an apparatus suitable for the regulation. Connected to the steam conduit 3 is a steam cylinder 10, the piston 11 of which is actuated by the steam pressure contrary to the action of the adjustable spring 12. The piston 11 actuates in turn the slide-valve 13 controlling the supply of pressure oil from the conduit 14 to the cylinder 15. The piston 16 actuates a lever 17 serving as a pointer and at the same time the slide-valve 18 of a servo-motor 19. The slide-valve 18 controls in well-known manner the supply of pressure oil from the conduit 20 branched out from the conduit 14 to said servo-motor, the piston 21 of which moves the swingable lever 22 and its shaft 23. The conduits 24 and 25 conduct the pressure oil to the receptacle 26 and back to the oil pump 27. The rod of the piston 21 is journalled to the lever 17 and movable in its longitudinal direction.

Inserted in the conduit 28 is a non-return valve 29 and in the conduits 14 and 20 valves 30 and 31 regulating the passing quantity of oil. Besides a scale 32 is provided.

The apparatus described operates as follows: The piston 11 and the slide-valve 13 move to the right or to the left according as the steam pressure in the conduit is increasing or decreasing respectively. A steam pressure of 8 atm. corresponds to the middle-position of the piston and slide valve shown. At a pressure of for instance 10 or 6 atm. the slide-valve 13 is moved so far to the right or the left respectively that it commences to admit pressure oil to the right or left side respectively of the piston 16. The quantity of the oil supplied to the cylinder 15 is proportional to the amount by which the steam pressure exceeds 10 atm. or is below 6 atm.

By adjusting or testing the supply of oil it may be easily attained that the piston 16, the deflections of which regulate the intensity of fire, as described below, rapidly but without overregulations operates proportionally to the surface of the curve P in the diagram hatched crosswise.

As far as the manner of operation of the apparatus according to Fig. 3 is described above, the apparatus together with the lever 17 and the scale 32 affords a valuable indicating means for the stoker.

The servo-motor operates as follows:

Supposing the pressure in the conduit 3 has reached 10 atm., the piston 11 together with the valve 13 is moved to the right and pressure oil enters the cylinder 15 to the right of the piston 16, which on account thereof is moved to the left. Consequently the lever 17 is turned to the left, thus moving the slide-valve 18 to the left and causing pressure oil to enter the servo-motor 19, the piston 21 thereby being moved to the right and the lever 22 together with the shaft 23 being turned to the right. Simultaneously with this movement of the piston 21 the valve 18 is returned to the middle position by the aid of the lever 17. The two positions $i$ and $k$ of the lever 22 shown in the drawing correspond to the high and low values of the intensities of fire respectively indicated in the diagram in Fig. 2. From the above description it will readily be seen that when the pressure decreases in conduit 3 the operation is the opposite of what is above outlined.

When rotated, the shaft 23 influences the firing as described below with reference to Figs. 4 and 5.

Fig. 4 illustrates in side view the forewall of a boiler provided with moving grate. The grate is designated by 40 and the coal funnel by 41. 42 is a lever serving in well known manner to adjust the speed of the grate and the depth of the fuel layer, the draught being controlled at the same time by the adjustment of a damper with the aid of said lever, the rod 43, the lever 44 and the shaft 45. The shaft 23 described in connection with Fig. 3 is designated in Fig. 4 by the same reference numeral. Connected with said shaft is a lever 46 which is also in connection with a socket 48 movable along the rod 47. Provided on the rod 47 between the socket 48 and two stops 49 and 50 are two coiled springs 51. The rod 47 is connected with the lever 42 mentioned above. 52 designates two stops limiting the movement of the lever 42.

This device operates as follows:

On turning the shaft 23 together with the lever 46 for instance in clockwise direction, the rod 47 is moved downwards thus moving the lever 42 in the same direction, the intensity of the fire and the draught being adjusted correspondingly. It is contrary in case the shaft be turned in opposite direction.

The springs 51 and the resilient connection with the shaft 23 effected by the same serve three different purposes:

1. In case of jamming to protect the mechanism against damage;
2. When necessary to permit manipulation by hand of the automatic regulation;
3. By means of the stops 52 to prevent excessive intensity of fire, which may be detrimental to the boiler, as well as entirely extinguishing the fire caused by the automatic device.

Fig. 5 illustrates in side view the front wall of a boiler provided with underfeed furnace. Also in this case the shaft 23 actuates the rod 47 by the aid of the lever 46, the socket 48 and the springs 51. The said rod operates by means of the lever 53 a valve 54. Said valve controls the supply of steam through the conduit 58 connected with the working cylinder 59 of the stoker arranged in well-known manner. By moving the rod 47 by means of the lever 55 the damper 57 provided in the channel 56 of the forced draught mechanism is adjusted.

In this case the supply of fuel to the boiler depends upon the number of strokes of the piston in the cylinder 59 and is regulated in the simplest manner by adjusting the steam valve 54. The adjustment of this valve is effected in the embodiment shown by turning the shaft 23 by the aid of the members mentioned above. Instead of the lever 53 another device may be used by the aid of which operation by hand may be performed, as described in connection with Fig. 4. On the adjustment of the valve 54 the damper 57 is adjusted simultaneously by means of the rod 47 and the lever 55.

The regulating apparatus shown in Fig. 3 is indicated in Fig. 1 by the circle 60. The shaft 23 extending from said apparatus is also indicated in Fig. 1 and influences the firing of two of the three boilers 2 in the same manner as described in connection with Figs. 4 and 5, it being supposed that the middle boiler is provided with moving grate while the right boiler is equipped with forced draught device. The remaining boilers of the plant may be regulated by hand, as usual, particularly those having constant load, whereas the two boilers described take care of the varying part of the requirement of steam. Instead thereof also the boiler for a pressure of 5 atm. may be regulated by the regulating apparatus 60, said alternative being indicated in Fig. 1 by dotted lines.

The apparatus described above effects the control of the intensity of fire according to the invention and in the manner indicated in the diagram shown in Fig. 2 in correspondence with the line *g—h* showing the intensity of fire as a function of the time. As will appear therefrom, the intensity of fire remains approximately constant as long as the pressure varies between the limits 10 and 6 atm. If the pressure exceeds or falls below said limits, another adjustment of the fire sets in automatically, as described above.

Fig. 6 illustrates another embodiment. In this plant two water tube boilers 68 having a working pressure of 25 atm., one boiler 61 having large water space and a steam accumulator 62 both constructed for 7 atm. are provided. 63 designates an overflow-valve inserted in the conduit 64 and arranged so as to open when the steam pressure in the conduit 64 exceeds a maximum, the surplus of the steam generated in the two boilers 68 being thereby admitted to the piping 65. Said valve maintains consequently in the conduit 64 a constant pressure adapted for the steam engine 66. The pressure in the conduit 65 varies between 7 and 2 atm. for the purpose of utilizing the existing accumulating capacity of the boiler 61 and the storer 62. The reducing valve 67 inserted in the conduit 65 conducts steam reduced to 2 atm. to other steam consumers not shown in the drawing. Also in this plant the regulating device is indicated by the circle 60, said device being influenced by the pressure in said conduit 65, in which the variations of pressure between 7 and 2 atm. occur, and regulating the firing of the one boiler 68 as well as, if desired, also the firing of the boiler 61. As long as the pressure in the conduit 65 varies between the limits 7 and 2 atm., the adjusted intensity of fire remains approximately constant. Upon exceeding or falling below the two limits of pressure, another intensity of fire is adjusted automatically.

Furnaces operating by means of liquid or gaseous fuel may be constructed in analogous manner, the regulating apparatus regulating the supply of oil or gas. Instead of a single damper regulating the draught several regulating devices of this kind, registers and the like may be connected with the regulating apparatus as well as devices for automatic regulation of the atomization, the air supply or the like.

What I claim as new and desire to secure by Letters Patent of the United States is:—

1. In a steam plant equipped with a steam accumulator, in combination, a steam boiler, a fire in said boiler, means to regulate said fire responsive to pressures in said accumulator above an upper limit of pressure and below a lower limit of pressure, said means being inoperative for intermediate pressures.

2. In a steam plant equipped with a steam accumulator, in combination, a steam boiler having a furnace, means for feeding fuel to the furnace, mechanism operated by and in accordance with variations of pressure in said accumulator for operating said means to maintain the intensity of the fire constant as long as the variations of pressure remain within a certain range between an upper and a lower limit of pressure, the range between said upper and lower limits being greater than 20 pounds, and to increase the intensity of the fire when the pressure falls below the lower limit and to decrease the intensity of the fire when the pressure rises above the upper limit.

3. In a steam plant equipped with a steam accumulator, in combination, a steam boiler, a mechanical stoker for said boiler, a servo-motor controlling said stoker, means to control said servo-motor, mechanism actuated in accordance with variations in pressure in said accumulator to control said means when the said pressure is outside a certain range of pressure, within which range the said means is inoperative.

4. In a steam plant equipped with a steam accumulator, in combination, a steam boiler, means to feed air and fuel to said boiler, a servo-motor actuating said means, mechanism actuated by and in accordance with variations of pressure in the accumulator and in operative relation to said servo-motor to cause the servo-motor to remain idle during changes of pressure between a lower and a higher limit and to cause a movement of said servo-motor at pressures above said higher limit and below said lower limit.

5. In a steam plant equipped with a steam accumulator, in combination, a steam boiler, means to supply heat to said boiler, a servo-motor to control said means, a slide valve controlling the operation of said servo-motor so arranged that a movement of said slide valve between certain positions has no effect on said servo-motor and movement beyond the said certain positions causes movement of the servo-motor, pressure responsive means adapted to operate said slide actuated in accordance with changes of pressure in the accumulator.

6. In a steam plant equipped with a steam accumulator, in combination, a boiler having a furnace, means to feed fuel to the furnace, means operated in accordance with changes of condition in said accumulator, means whereby the first means is unaffected by certain variations in said second means and is operated by said second means during other variations.

7. In a steam plant equipped with a steam accumulator, in combination, a boiler, a mechanical stoker for said boiler, control means for said stoker, a lever operating said control means, resilient mechanism disposed between said lever and said control means, a servo-motor controlling the operation of said lever, a mechanism controlling the operation of said servo-motor, said last-mentioned mechanism being responsive to pressure changes in the accumulator and operating said servomotor when the pressure in the accumulator is above an upper limit of pressure and below a lower limit of pressure, said mechanism being inoperative to move said servo-motor at intermediate pressures.

8. In a steam plant equipped with a steam accumulator, in combination, a boiler, a damper associated with said boiler, means to control said damper, said means being responsive to pressures in said accumulator above an upper limit of pressure and below a lower limit of pressure and said means being inoperative during intermediate pressures.

9. In a steam plant equipped with a steam accumulator, in combination, a boiler, a damper associated with said boiler, resilient means to control said damper, a servo-motor to control said resilient means, mechanism to operate said servo-motor responsive to pressure in said accumulator, said mechanism operating said servo-motor when the pressure in the accumulator is above an upper limit of pressure and below a lower limit of pressure, said mechanism being inoperative to move said servo-motor at intermediate pressures.

10. In a steam plant, in combination, a steam generator, an accumulator, a passage for steam from said generator to said accumulator, valve mechanism in said passage operating to maintain a constant pressure in said generator, means for feeding fuel to said steam generator, mechanism operated by and in accordance with variations of pressure in said accumulator for operating said means to maintain the intensity of the fire constant as long as the variations of pressure remain within a certain range between an upper and a lower limit of pressure, the range between said upper and lower limits being greater than 20 pounds, and to increase the intensity of the fire when the pressure falls below the lower limit and to decrease the intensity of the fire when the pressure rises above the upper limit.

11. In a steam plant, in combination, a steam generator, an accumulator, a passage for steam from said generator to said accumulator, valve mechanism in said passage operating to maintain a constant pressure in said generator, means for feeding fuel to said steam generator, mechanism operated by and in accordance with variations in the state of charge of said accumulator for operating said means to maintain the intensity of the fire constant as long as the variations of pressure remain within a certain range between an upper and a lower limit of pressure, the range between said upper and lower limits being greater than 20 pounds, and to increase the intensity of the fire when the pressure falls below the lower limit and to decrease the intensity of the fire when the pressure rises above the upper limit.

12. In a steam plant, in combination, a steam generating system divided into two interconnected sections, the first section generating steam at substantially constant pressure while the second generates steam at varying pressure thereby utilizing the accumulating capacity of said second section, steam consumers supplied by said sections and an automatic valve acting between said sections to maintain a constant pressure in the first section.

13. A steam plant as set out in claim 12 including means to control the fuel supply to one or more boilers of the steam generating system automatically in response to variations of steam pressure in the second section, said means being responsive to pressure variations in said second section above an upper limit of pressure and below a lower limit of pressure and said means being inoperative during intermediate pressures.

14. A steam plant according to claim 12 including a steam accumulator connected to said second section.

In testimony whereof I affix my signature.

ERNST CONSTAM.